US010911453B2

(12) United States Patent
Pularikkal et al.

(10) Patent No.: US 10,911,453 B2
(45) Date of Patent: Feb. 2, 2021

(54) CONTROLLING ACCESS TO NETWORKS IN A HETEROGENEOUS NETWORK ENVIRONMENT

(71) Applicant: Cisco Technology, Inc., San Jose, CA (US)

(72) Inventors: Gangadharan Byju Pularikkal, San Jose, CA (US); Mark Grayson, Berkshirem (GB); Santosh Ramrao Patil, Santa Clara (CA); Jerome Henry, Pittsboro, NC (US); Bart Brinckman, Nevele (BE); Mark Allen Webb, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 206 days.

(21) Appl. No.: 15/854,155

(22) Filed: Dec. 26, 2017

(65) Prior Publication Data

US 2019/0199725 A1    Jun. 27, 2019

(51) Int. Cl.
*H04L 29/06*    (2006.01)
*H04W 76/10*    (2018.01)
(Continued)

(52) U.S. Cl.
CPC ............ *H04L 63/10* (2013.01); *H04L 63/083* (2013.01); *H04W 12/06* (2013.01); *H04W 12/08* (2013.01);
(Continued)

(58) Field of Classification Search
CPC . H04L 63/0876; H04L 63/08; H04L 63/0853; H04L 63/0892; H04L 63/10;
(Continued)

(56) References Cited

U.S. PATENT DOCUMENTS 8,051,472 B2    11/2011  Maes
9,219,816 B2    12/2015  Grayson
(Continued)

FOREIGN PATENT DOCUMENTS

EP    2139260 A1    12/2009

OTHER PUBLICATIONS

"Usability and Evaluation of a Deployed 4G Network Prototype," Cuevas, et al., Journal of Comm. and Networks, vol. 7, No. 2, Jun. 2003. (Year: 2004).*

(Continued)

*Primary Examiner* — Tae K Kim

(57) ABSTRACT

Various implementations disclosed herein enable controlling access to networks. In various implementations, a method of controlling access to a network is performed by a computing device including one or more processors, and a non-transitory memory. In various implementations, the method includes obtaining an indication that a mobile device having access to a first network utilizing a first radio access technology (RAT) has requested access to a second network utilizing a second RAT. In some implementations, the method includes determining whether the access to the first network satisfies an authentication criterion associated with the second network. In some implementations, the method includes granting the mobile device access to the second network in response to determining that the access to the first network satisfies the authentication criterion associated with the second network. In some implementations, accessing the second network via the authentication criterion satisfies an operating threshold associated with the mobile device.

20 Claims, 8 Drawing Sheets

(51) Int. Cl.
*H04W 12/06* (2009.01)
*H04W 12/08* (2009.01)
*H04W 88/10* (2009.01)
*H04W 88/06* (2009.01)
*H04W 36/14* (2009.01)

(52) U.S. Cl.
CPC ....... *H04W 76/10* (2018.02); *H04L 2463/082* (2013.01); *H04W 36/14* (2013.01); *H04W 88/06* (2013.01); *H04W 88/10* (2013.01)

(58) Field of Classification Search
CPC .............. H04L 63/0884; H04W 12/08; H04W 12/0804
See application file for complete search history.

(56) References Cited

U.S. PATENT DOCUMENTS

| | | | | |
|---|---|---|---|---|
| 9,374,348 | B2* | 6/2016 | Ahmed | H04L 63/08 |
| 9,420,002 | B1 | 8/2016 | McGovern et al. | |
| 10,541,926 | B2* | 1/2020 | Singh | H04L 69/321 |
| 10,652,746 | B2* | 5/2020 | Engan | H04W 12/08 |
| 2004/0203602 | A1* | 10/2004 | Karaoguz | H04W 12/06 455/411 |
| 2005/0190747 | A1* | 9/2005 | Sindhwani | H04W 88/06 370/352 |
| 2006/0268902 | A1* | 11/2006 | Bonner | H04L 63/102 370/401 |
| 2006/0270411 | A1* | 11/2006 | Grayson | H04W 36/14 455/444 |
| 2011/0149874 | A1* | 6/2011 | Reif | H04L 63/08 370/329 |
| 2014/0073289 | A1* | 3/2014 | Velasco | H04W 12/04 455/411 |
| 2014/0101726 | A1* | 4/2014 | Gupta | H04B 7/0486 726/4 |
| 2014/0328250 | A1 | 11/2014 | Hardy et al. | |
| 2015/0156122 | A1* | 6/2015 | Singh | H04L 47/193 370/235 |
| 2016/0037340 | A1* | 2/2016 | Rayment | H04W 76/11 370/338 |
| 2016/0134624 | A1* | 5/2016 | Jacobson | H04W 12/08 726/4 |
| 2016/0337858 | A1* | 11/2016 | Weidenfeller | H04L 63/107 |
| 2017/0134944 | A1 | 5/2017 | Christian et al. | |
| 2020/0153740 | A1* | 5/2020 | Singh | H04W 28/0226 |

OTHER PUBLICATIONS

International Search Report and Written Opinion in corresponding International Application No. PCT/US2018/067540, dated Apr. 9, 2019, 14 pages.
A. Cuevas, et al., "Usability and Evaluation of a Deployed 4G Network Prototype", Journal of Communications and Networks, vol. 7, No. 2, Jun. 2005, 10 pages.
R. Barnes et al., "Automatic Certificate Management Environment (ACME) draft-ietf-acme-acme-06", ACME Working Group, Internet-Draft, Intended status: Standards Track, Mar. 13, 2017, 71 pages.
R. Valmikam et al., "Extensible Authentication Protocol (EAP) Attributes for Wi-Fi Integration with the Evolved Packet Core", Internet Engineering Task Force (IETF), Request for Comments: 7458, Category: Informational, ISSN: 2070-1721, Feb. 2015, 18 pages.
Karl Norrman et al., "Protecting IMSI and User Privacy in 5G Networks", Jun. 18, 2016, 8 pages.

* cited by examiner

CONTROLLING ACCESS TO NETWORKS IN A HETEROGENEOUS NETWORK ENVIRONMENT

TECHNICAL FIELD

The present disclosure relates generally to networks, and in particular, to controlling access to networks in a heterogeneous network environment.

BACKGROUND

Most electronic communication devices are capable of accessing networks that utilize different radio access technologies (RATs). For example, some mobile devices are capable of accessing a base station of a cellular network that utilizes a first RAT, and a wireless access point of a wireless network that utilizes a second RAT. Many wireless networks, especially wireless networks operated by enterprises, are secured networks that require a user of a mobile device to obtain credentials for the wireless network and use the credentials to access the wireless network. For example, an enterprise provides login credentials that a user uses to join a wireless network operated by the enterprise. As a mobile device moves into areas covered by different wireless networks, a user of the mobile device often has to obtain credentials for each wireless network and manually input the credentials into the mobile device in order to join the wireless network.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
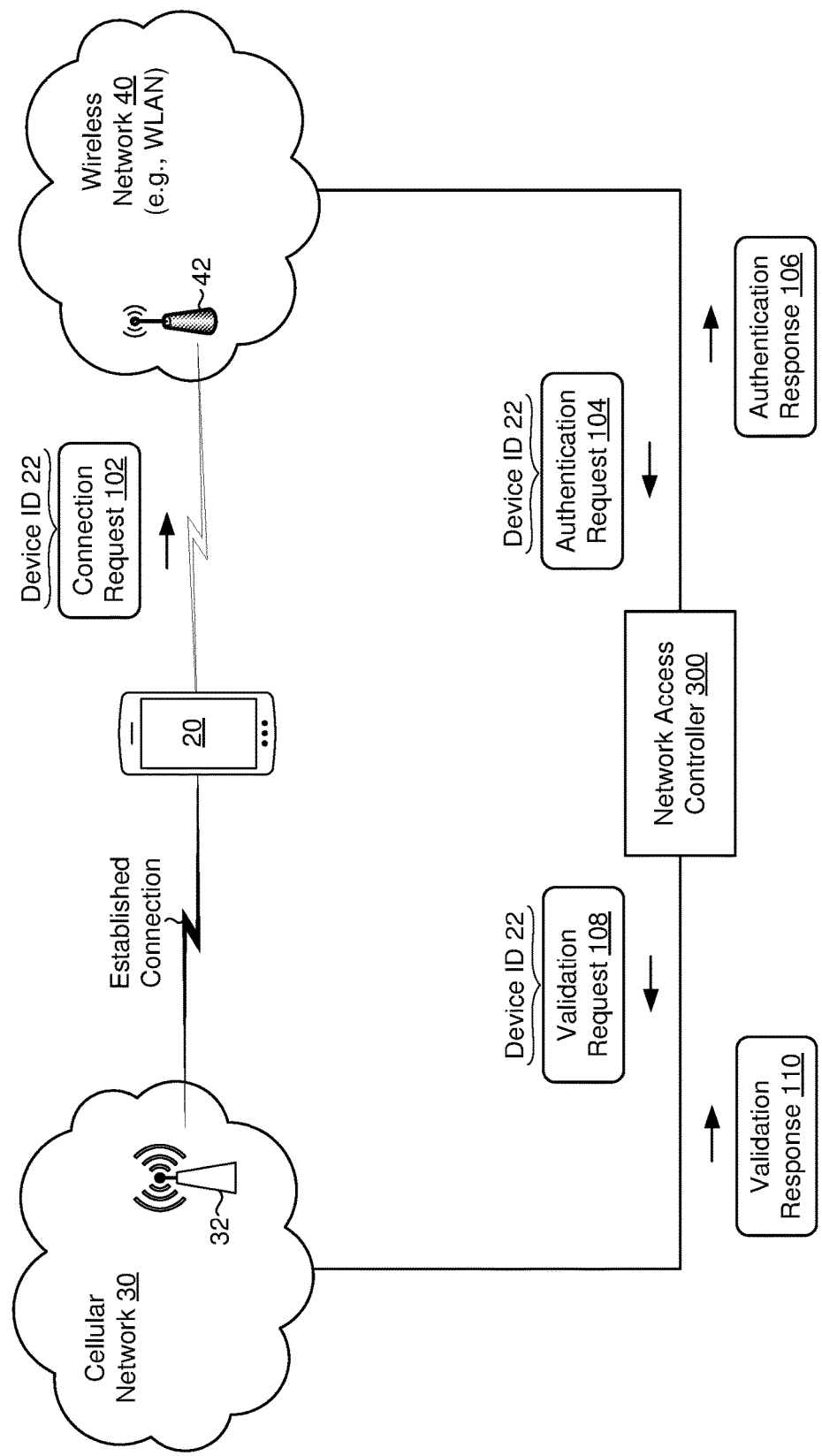
FIG. 1 is a schematic diagram of a heterogeneous network environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Various implementations disclosed herein enable controlling access to networks in a heterogeneous network environment. For example, in various implementations, a method of controlling access to a network is performed by a computing device. In various implementations, the computing device includes one or more processors, and a non-transitory memory. In various implementations, the method includes obtaining an indication that a mobile device having access to a first network utilizing a first radio access technology (RAT) has requested access to a second network utilizing a second RAT. In some implementations, the method includes determining whether the access to the first network satisfies an authentication criterion associated with the second network. In some implementations, the method includes granting the mobile device access to the second network in response to determining that the access to the first network satisfies the authentication criterion associated with the second network. In some implementations, accessing the second network via the authentication criterion satisfies an operating threshold associated with the mobile device.

EXAMPLE EMBODIMENTS

When a mobile device requests access to a wireless network, the wireless network typically requires the mobile device to provide login credentials. As the mobile device moves between geographical areas covered by different wireless networks, the mobile device is often required to provide login credentials for different wireless networks. As such, a user of the mobile device obtains login credentials for various wireless networks, and manually inputs the login credentials into the mobile device. Inputting the login credentials for various wireless networks into the mobile device is time-consuming. Moreover, inputting the login credentials for various wireless networks results in more power being consumed by the mobile device. For example, a display of the mobile device stays lit while the user inputs the login credentials. Moreover, storing the login credentials for numerous wireless networks results in increased memory usage.

The present disclosure provides a network access controller that allows a mobile device to connect to various wireless networks based on an access of the mobile device to a cellular network. The network access controller determines whether the mobile device has valid access to the cellular network. For example, the network access controller determines whether the mobile device is a subscriber of the cellular network. If the mobile device has valid access to the cellular network, the network access controller allows the mobile device to connect to the wireless network without establishing/providing credentials for the wireless network. As such, a user of the mobile device does not have to manually input login credentials for the wireless network. Reducing the need to manually input login credentials for the wireless network reduces the power consumption of the mobile device. For example, the display of the mobile device does not have to stay lit while the user inputs the login credentials. Allowing the mobile device to connect to various wireless networks based on an access of the mobile device to a cellular network also reduces memory usage. For example, the mobile device need not store login credentials for various wireless networks.

FIG. 1 is a schematic diagram of a heterogeneous network environment 10 (e.g., a network environment with networks that utilize different radio access technologies (RATs)). While certain specific features are illustrated, those of ordinary skill in the art will appreciate from the present disclosure that various other features have not been illustrated for the sake of brevity and so as not to obscure more pertinent aspects of the example implementations disclosed herein. To that end, the heterogeneous network environment 10 includes a mobile device 20, a cellular network 30, a wireless network 40, and a network access controller 300. In some implementations, the cellular network 30 utilizes a first RAT, and the wireless network 40 utilizes a second RAT that is different from the first RAT. In some implementations, a RAT refers to an underlying physical connection method for a radio based communication network.

In various implementations, the cellular network 30 includes various cellular network nodes such as a base station 32 (e.g., an eNode B). In various implementations, the base station 32 provides data and/or telephonic services to various cellular devices such as the mobile device 20. For example, in some implementations, the cellular network 30 provides a communication channel that the wireless device 20 utilizes to access the base station 32. In some implementations, the cellular network 30 operates in accordance with 3GPP standards. For example, in some implementations, the cellular network 30 is a fifth-generation (5G) cellular network. In some implementations, the cellular network 30 includes a fourth-generation (4G) cellular network (e.g., a Long Term Evolution (LTE) network). In other words, in some implementations, the RAT utilized by the cellular network 30 corresponds to 4G or 5G cellular networks.

In various implementations, the wireless network 40 includes various wireless network nodes such as a wireless access point 42. In various implementations, the wireless access point 42 provides data and/or telephonic services to various wireless devices such as the mobile device 20. For example, in some implementations, the wireless network 40 provides a communication channel that the mobile device 20 utilizes to access the wireless access point 42. In some implementations, the wireless network 40 operates in accordance with IEEE 802.11 standards. In other words, in some implementations, the RAT utilized by the wireless network 40 corresponds to 802.11 standards. More generally, in various implementations, the RAT utilized by the wireless network 40 is different from the RAT utilized by the cellular network 30. In some implementations, the wireless network 40 includes a Wireless Fidelity (Wi-Fi) network. In various implementations, the wireless network 40 includes a short-range communication network with a communication range from several feet to a few hundred feet.

In various implementations, the wireless network 40 is a secured network. For example, in some implementations, the wireless network 40 requires login credentials to provide access to the wireless network 40. In some implementations, the wireless network 40 is an enterprise network that is controlled by an enterprise operator. In such implementations, the enterprise operator issues (e.g., generates and distributes) login credentials for the wireless network 40 to authorized users (e.g., to users employed by the enterprise, and/or to users that are customers/clients of the enterprise). In some implementations, the login credentials include a username and a password. In some implementations, the login credentials include tokens. For example, in some implementations, the wireless network 40 utilizes two-factor authentication (e.g., a password and a token).

In various implementations, the mobile device 20 supports multiple RATs. In the example of FIG. 1, the mobile device 20 supports the first RAT utilized by the cellular network 30 and the second RAT utilized by the wireless network 40. In some implementations, the mobile device 20 is associated with the cellular network 30. For example, in some implementations, the mobile device 20 is a subscriber of the cellular network 30. In other words, in some implementations, the mobile device 20 subscribes to a cellular service plan provided by the cellular network 30. In some implementations, the mobile device 20 has valid access to the cellular network 30. For example, the mobile device 20 has valid credentials for accessing the cellular network 30. In some implementations, the cellular network 30 stores a device identifier (ID) 22 of the mobile device in association with information indicating that the mobile device 20 has valid access to the cellular network 30. For example, in some implementations, the cellular network 30 stores the device ID 22 in association with the cellular service plan of the mobile device 20.

In various implementations, the network access controller 300 controls access to the wireless network 40. In some implementations, the network access controller 300 allows the mobile device 20 to access the wireless network 40 based on the access that the mobile device 20 has to the cellular network 30. For example, in some implementations, the network access controller 300 determines whether the mobile device 20 has valid access to the cellular network 30. In some implementations, the network access controller 300 allows the mobile device 20 to access the wireless network 40 in response to determining that the mobile device 20 has valid access to the cellular network 30. For example, in some implementations, the network access controller 300 instructs the wireless network 40 to allow the mobile device 20 to access the wireless network 40 in response to the mobile device 20 having a valid cellular service plan for the cellular network 30. In some implementations, the network access controller 300 determines whether the mobile device 20 has valid credentials for the cellular network 30. In some implementations, the network access controller 300 allows the mobile device 20 to access the wireless network 40 in response to determining that the mobile device 20 has valid credentials for the cellular network 30. In some implementations, the network access controller 300 allows the mobile device 20 to access the wireless network 40 with the credentials for the cellular network 30.

In various implementations, the network access controller 300 denies the mobile device 20 access to the wireless network 40 in response to determining that the mobile device 20 does not have valid access to the cellular network 30. For example, in some implementations, the network access controller 300 denies the mobile device 20 access to the wireless network 40 in response to determining that the mobile device 20 does not have a valid cellular service plan for the cellular network 30. In some implementations, the network access controller 300 denies the mobile device 20 access to the wireless network 20 in response to determining that the mobile device 20 does not have valid credentials for the cellular network 30).

In various implementations, the network access controller 300 enables the mobile device 20 to access the wireless network 40 without obtaining credentials specifically for the wireless network 40. For example, in some implementations, the network access controller 300 enables the mobile device 20 to access the wireless network 40 without requiring a user of the mobile device 20 to obtain credentials for the wireless network 40. In some implementations, the network access controller 300 enables the mobile device 20 to access the wireless network 40 without requiring the user of the mobile device 20 to manually input the credentials for the wireless network 40 into the mobile device 20. In various implementations, the network access controller 300 allows the mobile device 20 to satisfy an operating threshold. For example, in some implementations, the network access controller 300 allows the mobile device 20 to maintain its power consumption below a power consumption threshold (e.g., by not keeping a display of the mobile device 20 lit while the user manually inputs the credentials for the wireless network 40 into the mobile device). In some implementations, the network access controller 300 allows the mobile device 20 to maintain its memory usage below a memory usage threshold (e.g., by not storing credentials for the wireless network 40 and other wireless networks in a memory of the mobile device 40).

As illustrated in FIG. 1, in some implementations, the mobile device 20 transmits a connection request 102 to the wireless network 40. In some implementations, the connection request 102 is a request to join the wireless network 40. In some implementations, the connection request 102 includes the device ID 22. In some implementations, the connection request 102 does not include login credentials for the wireless network 40 (e.g., because the mobile device 20 does not have the credentials for the wireless network 40). As such, in some implementations, the wireless network 40 cannot authenticate the mobile device 20 based solely on the connection request 102. For example, in some implementations, the wireless network 40 cannot determine whether to trust the mobile device 20 based solely on the connection request 102.

In some implementations, the wireless network 40 transmits an authentication request 104 to the network access controller 300. In various implementations, the authentication request 104 is a request to authenticate the mobile device 20 for access to the wireless network 40. For example, in some implementations, the authentication request 104 is a request to determine whether the mobile device 20 satisfies an authentication criterion associated with the wireless network 40. In some implementations, the authentication request 104 is a request to determine whether the mobile device 20 already has access to another network (e.g., the cellular network 30) which is among a group of networks that are trusted by the wireless network 40. In some implementations, the authentication request 104 includes the device ID 22. In some implementations, transmitting the authentication request 104 includes forwarding the connection request 102 to the network access controller 300.

In various implementations, in response to receiving the authentication request 104, the network access controller 300 determines whether the mobile device 20 has valid access to the cellular network 30. For example, in some implementations, the network access controller 300 determines whether the mobile device 20 has valid credentials for the cellular network 30. In some implementations, the network access controller 300 determines whether the mobile device 20 is associated with a cellular service plan provided by the cellular network 30. More generally, in various implementations, the network access controller 300 determines whether the mobile device 20 satisfies an authentication criterion associated with the wireless network 40. For example, in some implementations, the network access controller 300 determines whether the mobile device 20 has valid access to another network that is among a group of networks that are trusted by the wireless network 40. More generally, in various implementations, the network access controller 300 determines whether the mobile device 20 has valid access to a computing resource (e.g., another network, an application, a distributed storage/computing platform, etc.) that is trusted by the wireless network 40. In some implementations, computing resources (e.g., other networks, applications, etc.) that have been previously authorized by the wireless network 40 are trusted by the wireless network 40.

In some implementations, the network access controller 300 determines whether the mobile device 20 has valid access to the cellular network 30 based on information stored at the network access controller 300. For example, in some implementations, the network access controller 300 includes a datastore that stores credentials of various devices for accessing various networks. In such implementations, the network access controller 300 queries the datastore with the device ID 22 to determine whether the datastore includes credentials of the mobile device 20 for accessing the cellular network 30. If the information stored in the datastore indicates that the mobile device 20 has valid access to the cellular network 30, the network access controller 300 transmits an authentication response 106 to the wireless network 40 indicating that the mobile device 20 has valid access to the cellular network 30.

In some implementations, the network access controller 300 transmits a validation request 108 to the cellular network 30. In some implementations, the validation request 108 is a request to validate the access of the mobile device 20 to the cellular network 30. In some implementations, the validation request 108 includes the device ID 22. In some implementations, transmitting the validation request 108 includes forwarding the authentication request 104. In some implementations, the network access controller 300 transmits the validation request 108 to the cellular network 30 when the network access controller 300 does not store information regarding the access of the mobile device 20 to the cellular network 30. For example, in some implementations, the network access controller 300 transmits the validation request 108 when a datastore of the network access controller 300 does not have the credentials of the mobile device 20 for accessing the cellular network 30, and/or when the datastore is not up-to-date.

In various implementations, the cellular network 30 receives the validation request 108 from the network access controller 300, and provides a validation response 110 to the network access controller 300 in response to receiving the validation request 108. In some implementations, the validation response 110 indicates that the mobile device 20 has valid access to the cellular network 30. For example, in some implementations, the validation response 110 indicates that the mobile device 20 has valid credentials for the cellular network 30. In some implementations, the validation response 110 indicates that the mobile device 20 is subscribed to a cellular service plan provided by the cellular network 30.

In various implementations, the network access controller 300 provides the authentication response 106 to the wireless network 40 in response to receiving the validation response 110 and/or in response to determining whether the mobile device 20 has valid access to the cellular network 30. In some implementations, transmitting the authentication response 106 includes forwarding the validation response 110. In some implementations, the authentication response 106 includes an instruction to allow the mobile device 20 to join the wireless network 40 based on the access that the mobile device 20 already has to the cellular network 30. In other words, in some implementations, the authentication response 106 includes an instruction to allow the mobile device 20 to join the wireless network 40 without establishing credentials that are specific to the wireless network 40. In some implementations, the authentication response 106 includes an instruction to deny the mobile device 20 access to the wireless network 40 (e.g., when the mobile device 20 does not have valid access to the cellular network 30, for example, when the mobile device 20 does not subscribe to a cellular service plan provided by the cellular network 30 and/or when the mobile device 20 does not have credentials for the cellular network 30).

In various implementations, the wireless network 40 operates on (e.g., acts upon) the connection request 102 based on the authentication response 106. For example, in some implementations, the wireless network 40 grants the connection request 102 in response to the authentication response 106 indicating that the mobile device 20 has valid access to the cellular network 30. In some implementations, the wireless network 40 allows the mobile device 20 to connect to (e.g., join) the wireless network 40 in response to the authentication response 106 including an instruction to grant the mobile device 20 access to the wireless network 40. In some implementations, the wireless network 40 denies the connection request 102 in response to the authentication response 106 indicating that the mobile device 20 does not have valid access to the cellular network 30. For example, in some implementations, the wireless network 40 does not allow the mobile device 20 to connect to the wireless network 40 in response to the authentication response 106 including an instruction to deny the mobile device 20 access to the wireless network 40.

In various implementations, the cellular network 30 and the wireless network 40 are operated by different operator entities. For example, in some implementations, the cellular network 30 is operated by a cellular network operator entity, and the wireless network 40 is operated by an enterprise operator entity. In some implementations, the cellular network 30 and the wireless network 40 do not share information with each other (e.g., due to security restrictions). As such, in various implementations, the network access controller 300 serves as an intermediary (e.g., a proxy) between the cellular network 30 and the wireless network 40.

Figure 2:
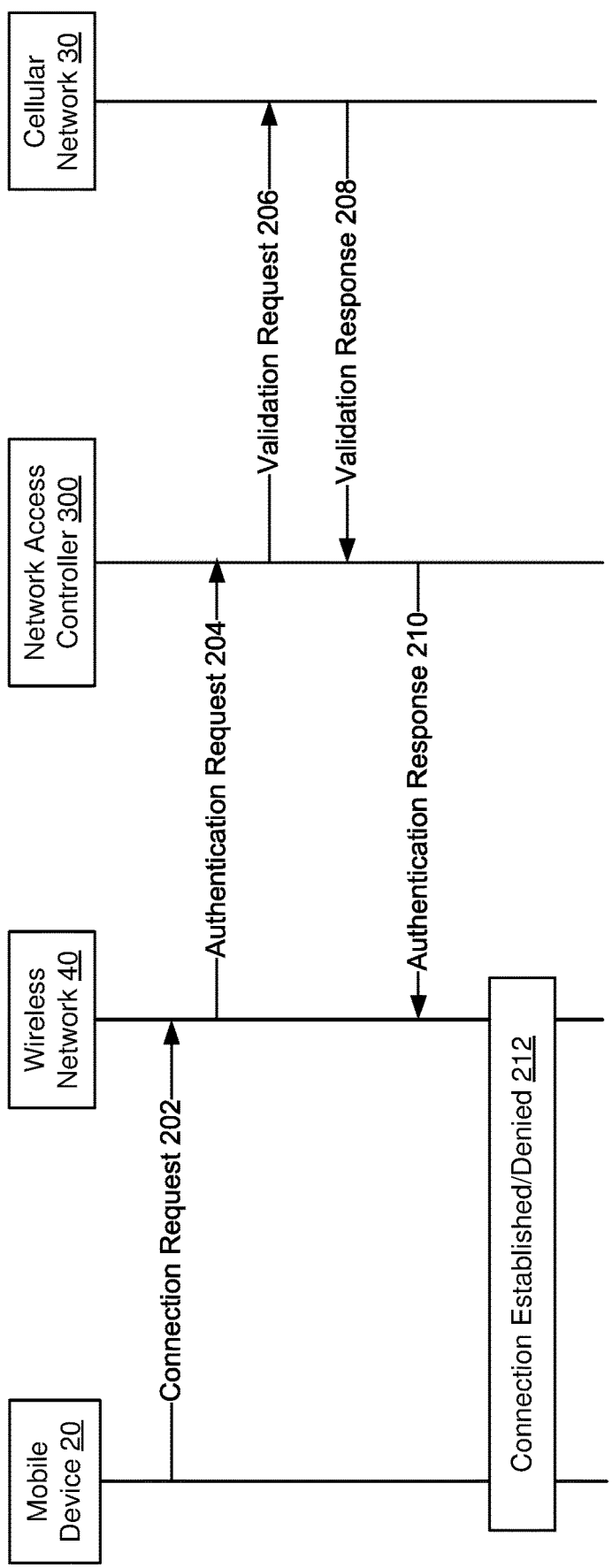
FIG. 2 is a sequence diagram illustrating a flow of requests and responses in accordance with some implementations.

FIG. 2 is a sequence diagram illustrating a flow of requests and responses in accordance with some implementations. At 202, the mobile device 20 transmits a connection request (e.g., the connection request 102 shown in FIG. 1) to the wireless network 40. As described herein, in various implementations, the connection request is a request to join the wireless network 40. In some implementations, the connection request includes a device ID (e.g., the device ID 22 shown in FIG. 1). In some implementations, the connection request does not include credentials for accessing the wireless network 40 (e.g., because the wireless network 40 has not issued the mobile device 20 credentials for accessing the wireless network 40).

At 204, the wireless network 40 transmits an authentication request (e.g., the authentication request 104 shown in FIG. 1) to the network access controller 300. As described herein, in some implementations, the authentication request is a request to determine whether to grant the mobile device 20 access to the wireless network 40. In some implementations, the wireless network 40 transmits the authentication request by forwarding the connection request.

At 206, the network access controller 300 transmits a validation request (e.g., the validation request 108 shown in FIG. 1) to the cellular network 30. As described herein, in some implementations, the validation request is a request to identify whether the mobile device 20 has valid access to the cellular network 30. In some implementations, the network access controller 300 transmits the validation request by forwarding the authentication request. In some implementations, the network access controller 300 transmits the validation request after determining that the network access controller 300 does not have sufficient amount of information to determine whether the mobile device 20 has valid access to (e.g., valid credentials for) the cellular network 30.

At 208, the network access controller 300 receives a validation response (e.g., the validation response 110 shown in FIG. 1) from the cellular network 30. As described herein, in some implementations, the validation response indicates whether the mobile device 20 has valid access to the cellular network 30.

At 210, the network access controller 300 transmits an authentication response (e.g., the authentication response 106 shown in FIG. 1) to the wireless network 40. As described herein, in various implementations, the network access controller 300 generates the authentication response based on the validation response. For example, in some implementations, if the validation response indicates that the mobile device 20 has valid access to the cellular network 30, the authentication response includes an instruction for the wireless network 40 to grant the connection request. In some implementations, if the validation response indicates that the mobile device 20 does not have valid access to the cellular network 30, the authentication response includes an instruction for the wireless network 40 to deny the connection request. In some implementations, the network access controller 300 transmits the authentication response by forwarding the validation response.

At 212, a connection is established or denied between the mobile device 20 and the wireless network 40 based on the authentication response. For example, in some implementations, if the authentication response indicates that the mobile device 20 has valid access to the cellular network 30, the wireless network 40 grants the connection request and allows the mobile device 20 to access the wireless network 40. In some implementations, if the authentication response indicates that the mobile device 20 does not have valid access to the cellular network 30, the wireless network 30 rejects the connection request and denies the mobile device 20 access to the wireless network 40.

Figure 3:
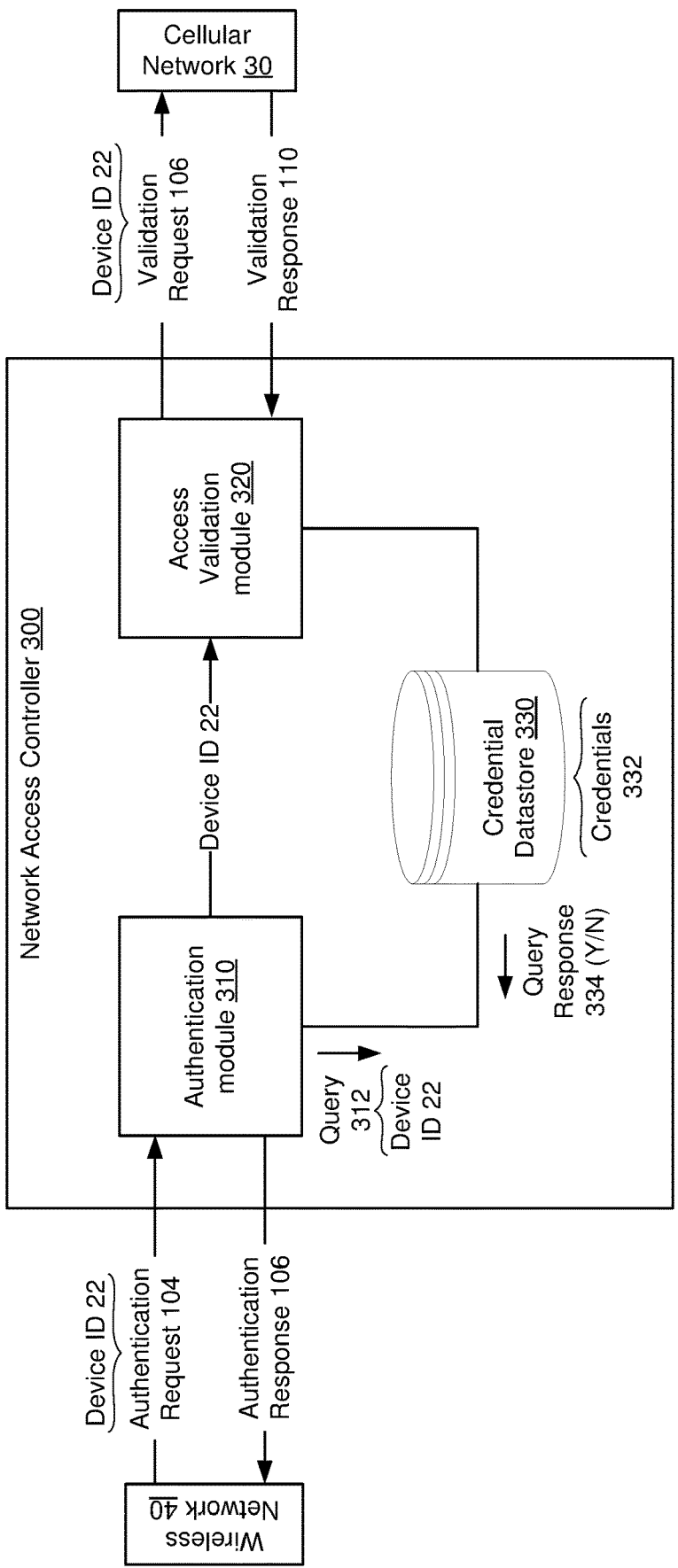
FIG. 3 is a block diagram of a network access controller in accordance with some implementations.

FIG. 3 illustrates a block diagram of the network access controller 300 in accordance with some implementations. In some implementations, the network access controller 300 includes an authentication module 310, an access validation module 320 and a credential datastore 330. Briefly, in various implementations, the authentication module 310, the access validation module 320 and the credential datastore 330, individually or in combination, authenticate a mobile device (e.g., the mobile device 20 shown in FIGS. 1 and 2), so that the mobile device can access a wireless network (e.g., the wireless network 40 shown in FIGS. 1 and 2) based on having access to a cellular network (e.g., the cellular network 30 shown in FIGS. 1 and 2).

In various implementations, the credential datastore 330 stores credentials 332 that devices utilize to access various networks. For example, in some implementations, the credentials 332 are associated with numerous devices that use the credentials 332 to access one or more cellular networks. In some implementations, the credentials 332 include usernames and passwords. In some implementations, the credentials 332 include binary entries indicating whether devices have valid access to certain networks (e.g., a '1' for having valid access and a '0' for not having valid access). More generally, in various implementations, the credential datastore 330 stores credentials 332 that are associated with various devices. In some implementations, the credentials 332 provide access to a network (e.g., the cellular network 30 shown in FIGS. 1 and 2, and/or a non-cellular network such as a wireless network similar to the wireless network 40 shown in FIGS. 1 and 2). In some implementations, the credentials 332 provide access to an application (e.g., an application that executes on a mobile device, a server and/or a distributed computing system). In some implementations, the credentials 332 provide access to a distributed network (e.g., a cloud computing network).

In various implementations, the authentication module 310 receives an authentication request 104 to authenticate a mobile device associated with the device ID 22. In some implementations, the authentication module 310 operates on the authentication request 104 by determining whether the mobile device associated with the device ID 22 has valid access to another network (e.g., the cellular network 30 shown in FIGS. 1 and 2). In some implementations, the authentication module 310 sends a query 312 to the credential datastore 330. In the example of FIG. 3, the query 312 includes the device ID 22. In various implementations, the authentication module 310 receives a query response 334 in response to sending the query 312. In some implementations, the query response 334 indicates whether the device ID 22 is associated with any of the credentials 332 stored in the credential datastore 330. More generally, in various implementations, the query response 334 indicates whether the mobile device 20 associated with the device ID 22 has valid access to another network (e.g., a cellular network, for example, the cellular network 30 shown in FIGS. 1 and 2). In some implementations, the query response 334 includes a binary value indicating whether the mobile device 20 has valid access to another network (e.g., a '1' for having valid access and a '0' for not having valid access).

In some implementations, the authentication module 310 provides an authentication response 106 to the wireless network 40 based on the query response 334. In some implementations, if the query response 334 indicates that the credentials 332 include credentials of the mobile device 20 to access the cellular network 30, the authentication module 310 generates an authentication response 106 that instructs the wireless network 40 to grant the mobile device 20 access to the wireless network 40. In some implementations, if the query response 334 indicates that the credentials 332 do not include credentials of the mobile device 20 to access the cellular network 30, the authentication module 310 generates an authentication response 106 that instructs the wireless network 40 to deny the mobile device 20 access to the wireless network 40.

In various implementations, the authentication module 310 determines whether the device ID 22 corresponds with credentials 332 that satisfy an authentication criterion for the wireless network 40. In some implementations, the authentication module 310 determines whether the credentials 332 corresponding with the device ID 22 are for accessing a computing resource (e.g., a network, an application, a distributed computing environment, etc.) that is trusted by the wireless network 40. In some implementations, if the authentication module 310 determines that the credentials 332 corresponding with the device ID 22 are for accessing a computing resource that is trusted by the wireless network 40, the authentication response 106 indicates that the mobile device 20 be granted access to the wireless network 40. In some implementations, if the authentication module 310 determines that the device ID 22 does not correspond to any of the credentials 332 or that the credentials 332 corresponding to the device ID 22 are for accessing a computing resource that is not trusted by the wireless network 40, the authentication response 106 indicates that the mobile device 20 be denied access to the wireless network 40.

Figure 5:
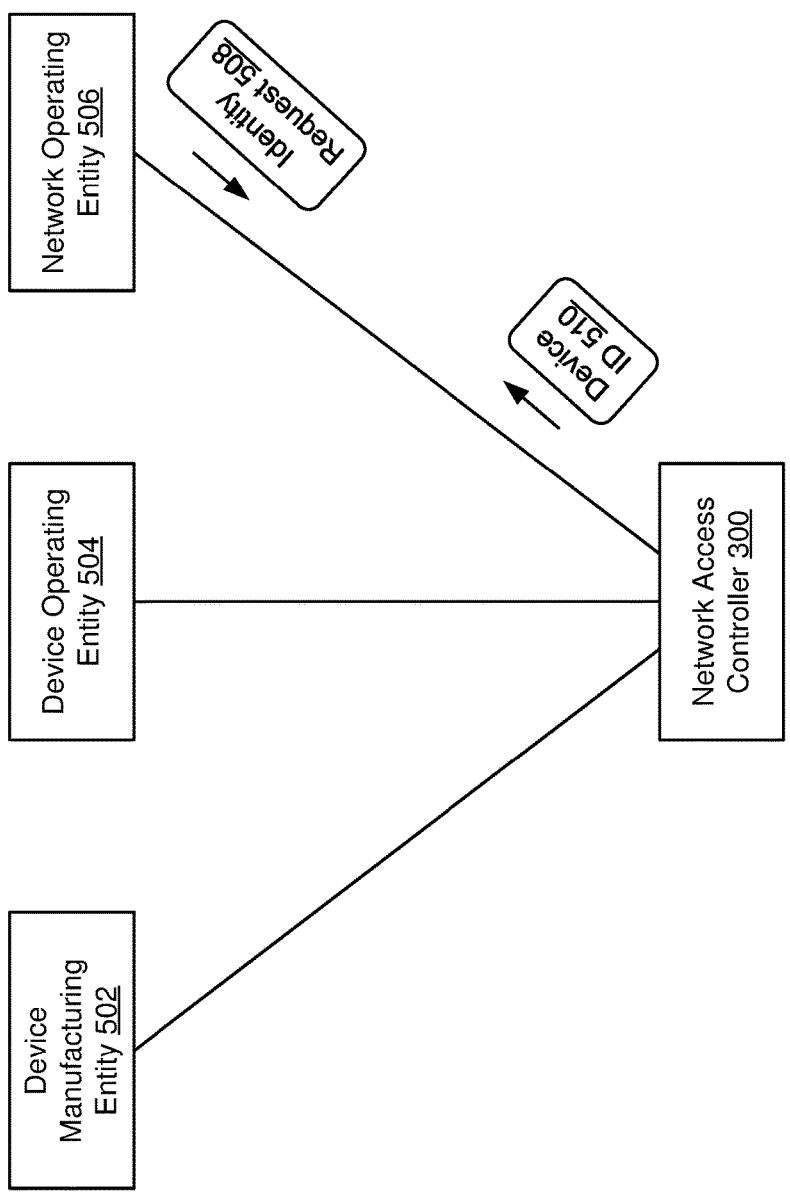
FIG. 5 is a schematic diagram of a network environment in accordance with some implementations.

In some implementations, the authentication module 310 determines whether a provider (e.g., an entity that generates and/or distributed credentials, for example, as illustrated in FIG. 5) of the credentials 332 corresponding to the device ID 22 satisfies the authentication criterion for the wireless network 40. For example, in some implementations, the authentication module 310 determines whether the provider is among a group of trusted providers. In such implementations, the authentication response 106 indicates whether the provider satisfies the authentication criterion for the wireless network 40. In some implementations, the authentication module 310 determines the provider of the credentials 332 based on a type of the credentials 332. For example, in some implementations, different providers issue different types of credentials.

In some implementations, the authentication module 310 determines whether a type of the credentials 332 corresponding with the device ID 22 satisfies the authentication criterion for the wireless network 40. For example, in some implementations, the wireless network 40 accepts a particular type of credential. In such implementations, the authentication module 310 determines whether the type of credentials 332 corresponding with the device ID 22 is the same as the particular type of credential accepted by the wireless network 40.

In some implementations, the authentication module 310 requests the access validation module 320 to validate the access of the mobile device 20 to the cellular network 30. In some implementations, the authentication module 310 invokes the access validation module 320 in response to the query response 334 indicating that the credentials 332 do not include credentials for the mobile device 20 to access to the cellular network 30. In other words, in some implementations, the authentication module 310 invokes the access validation module 320 when the credential datastore 330 does not have a record that corresponds to the device ID 22, or when the record indicates that the credentials of the mobile device 20 for accessing the cellular network 30 are invalid/expired. In some implementations, the authentication module 310 sends the device ID 22 to the access validation module 320.

In some implementations, the access validation module 320 sends the validation request 106 to the cellular network 30. In some implementations, the validation request 106 includes the device ID 22. In some implementations, the validation request 106 is a request to validate the access of the mobile device 20 to the cellular network 30. In some implementations, the access validation module 320 receives the validation response 110 in response to sending the validation request 106. In some implementations, the validation response 110 indicates whether the mobile device 20 has valid access to the cellular network 30. For example, in some implementations, the validation response 110 includes the credentials of the mobile device 20 for accessing the cellular network 30. In some implementations, the access validation module 320 updates the credential datastore 330 based on the validation response 110. For example, the access validation module 320 stores the credentials that the mobile device 20 uses to access the cellular network 30 in the credential datastore 320.

In some implementations, the authentication module 310 generates the authentication response 106 based on the validation response 110. For example, in some implementations, the authentication response 106 instructs the wireless network 40 to grant access to the mobile device 20 in response to the validation response 110 indicating that the mobile device 20 has valid access to the cellular network 30. In some implementations, the authentication response 106 instructs the wireless network 40 to grant the mobile device 20 access without requiring a user of the mobile device 20 to establish credentials for the wireless network 40. In some implementations, allowing the mobile device 20 to join the wireless network 40 with the same credentials that the mobile device 20 uses to access the cellular network 30 satisfies an operating threshold of the mobile device 20 (e.g., reducing power consumption by not keeping the display lit while the user manually inputs the credentials, and/or reducing memory usage by not storing credentials for the wireless network 40 and various other wireless networks).

In some implementations, the authentication response 106 instructs the wireless network 40 to deny access to the mobile device 20 in response to the validation response 110 indicating that the mobile device 20 does not have valid access to the cellular network 30. In some such implementations, the wireless network 40 requires a user of the mobile device 20 to establish credentials for the wireless network 40 thereby still allowing the mobile device 20 to access the wireless network 40 albeit not using the credentials that the mobile device 20 uses to access the cellular network 30.

Figure 4:
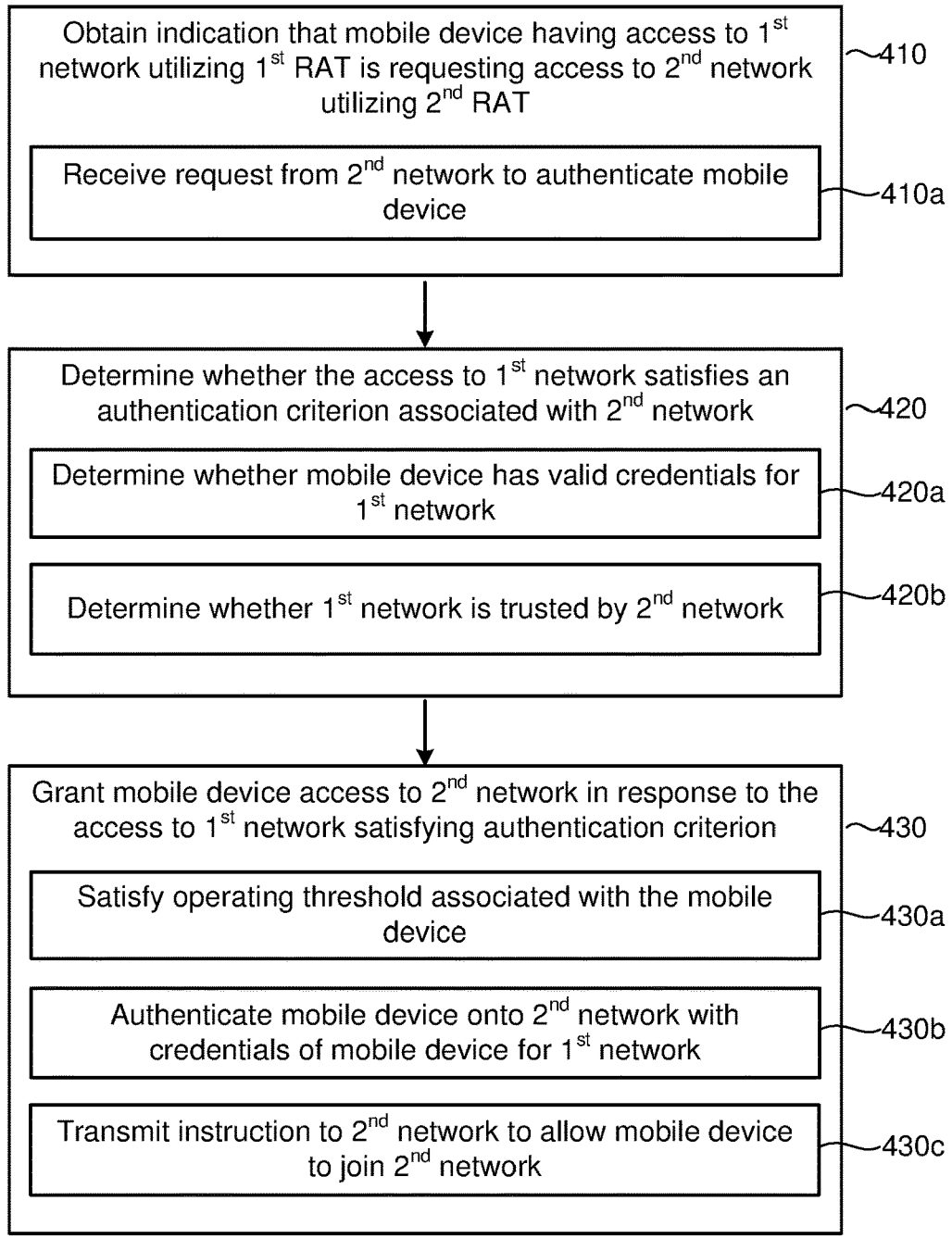
FIG. 4 is a flowchart representation of a method of controlling access to a network in a heterogeneous network environment in accordance with some implementations.

FIG. 4 is a flowchart representation of a method 400 of controlling access to a network (e.g., a wireless network, for example, the wireless network 40 shown in FIGS. 1-3) in a heterogeneous network environment (e.g., the heterogeneous network environment 10 shown in FIG. 1). In various implementations, the method 400 is implemented as a set of computer readable instructions that are executed at a network access controller (e.g., the network access controller 300 shown in FIGS. 1-3). Briefly, the method 400 includes obtaining an indication that a mobile device having access to a first network utilizing a first RAT has requested access to a second network utilizing a second RAT, determining whether the access to the first network satisfies an authentication criterion associated with the second network, and granting the mobile device access to the second network in response to determining that the access to the first network satisfies the authentication criterion associated with the second network.

As represented by block 410, in various implementations, the method 400 includes obtaining an indication that a mobile device having access to a first network utilizing a first RAT (e.g., a cellular network such as the cellular network 30 shown in FIGS. 1-3) has requested access to a second network utilizing a second RAT (e.g., a wireless network such as the wireless network 40 shown in FIG. 1-3). For example, in some implementations, the method 400 includes receiving an indication that the mobile device 20, which has access to the cellular network 30, has requested access to the wireless network 40. As represented by block 410a, in some implementations, the method 400 includes receiving an authentication request (e.g., the authentication request 104 shown in FIGS. 1 and 3) from the second network to authenticate the mobile device. In some implementations, the method 400 includes receiving a device ID (e.g., the device ID 22 shown in FIGS. 1 and 3) that identifies the mobile device requesting access to the second network.

As represented by block 420, in various implementations, the method 400 includes determining whether the access to the first network satisfies an authentication criterion associated with the second network. In some implementations, the method 400 includes determining whether or not the mobile device has valid access to the first network. For example, as represented by block 420a, in some implementations, the method 400 includes determining whether or not the mobile device has valid credentials for accessing the first network. In some implementations, the method 400 includes determining whether or not the mobile device is subscribed to a cellular service plan provided by the first network. As represented by block 420b, in some implementations, the method 400 includes determining whether the first network is trusted by the second network. For example, in some implementations, the method 400 includes determining whether the first network is among a group of networks trusted by the second network. In some implementations, the method 400 includes determining whether or not the first network utilizes security settings (e.g., password complexity, encryption algorithms, etc.) that are the same as or within a threshold of security settings employed by the second network.

In some implementations, the method 400 includes accessing a datastore (e.g., a local datastore, for example, the credentials datastore 330 shown in FIG. 3) to determine whether or not the datastore stores a record which indicates that the mobile device has valid access to the first network. In some implementations, the method 400 includes transmitting a validation request to the first network (e.g., the validation request 106 shown in FIGS. 1 and 3) to indicate whether the mobile device has valid access to the first network. In some implementations, the method 400 includes transmitting the validation request in response to the datastore not storing any information regarding the mobile device and/or the datastore being out-of-date. In some implementations, the method 400 includes receiving a validation response (e.g., the validation response 110 shown in FIGS. 1 and 3) in response to transmitting the validation request. In some implementations, the validation response indicates whether the mobile device has valid access to the first network.

As represented by block 430, in various implementations, the method 400 includes granting the mobile device access to the second network in response to determining that the access to the first network satisfies the authentication criterion associated with the second network. For example, in some implementations, the method 400 includes granting the mobile device access to the second network in response to determining that the mobile device has valid access to the first network. In some implementations, the method 400 includes allowing the mobile device to access the second network in response to determining that the mobile device has valid credentials for accessing the first network. In some implementations, the method 400 includes allowing the mobile device to access the second network in response to determining that the mobile device is subscribed to a cellular service plan provided by the first network. In some implementations, the method 400 includes granting the mobile device access to the first network in response to the validation response from the first network indicating that the mobile device has valid access to the first network.

As represented by block 430a, in some implementations, the method 400 includes satisfying an operating threshold associated with the mobile device by granting the mobile device access to the second network based on the mobile device having valid access to the first network. For example, in some implementations, the method 400 includes maintaining a power consumption of the mobile device below a threshold (e.g., by not keeping a display of the mobile device lit while a user of the mobile device manually inputs credentials for the second network). In some implementations, the method 400 includes maintaining a memory usage by the mobile device below a threshold (e.g., by not storing the credentials for the second network in a memory of the mobile device).

As represented by block 430b, in some implementations, the method 400 includes authenticating the mobile device onto the second network with credentials that the mobile device uses to access the first network. As represented by block 430c, in some implementations, the method 400 includes transmitting an instruction to the second network to allow the mobile device to access (e.g., join) the second network. For example, in some implementations, the method 400 includes transmitting an authentication response (e.g., the authentication response 106 shown in FIGS. 1 and 3) to the second network indicating that the mobile device has valid access to the first network.

In some implementations, the second network includes multiple levels of access. In some implementations, different levels of access are associated with different levels of network resources. For example, in some implementations, a device with guest level access has a lower bandwidth than a device with subscriber level access. In some implementations, the subscriber level access is for devices that are registered with the second network, and guest level access is for devices that are not registered with the second network. In some implementations, the method 400 includes granting the mobile device guest level access to the second network. More generally, in some implementations, the method 400 includes granting the mobile device restricted access to the second network. In some implementations, granting restricted access includes granting access for a limited amount of time (e.g., a day, a week, etc.). In some implementations, granting restricted access includes granting access to a limited amount of network resources (e.g., limiting the bandwidth of the mobile device for data transmitted/received over the second network).

In some implementations, the method 400 includes denying the mobile device access to the second network in response to determining that the mobile device does not have valid access to the first network. For example, in some implementations, the method 400 includes denying the mobile device access to the second network in response to the mobile device not having valid credentials for accessing the first network. In some implementations, the method 400 includes denying the mobile device access to the second network in response to the mobile device not being subscribed to a cellular service plan provided by the first network. In some implementations, the method 400 includes requiring the mobile device to establish credentials for the second network in order to access the second network in response to determining that the mobile device does not have valid access to the first network.

FIG. 5 is a schematic diagram of a network environment 500 in accordance with some implementations. In various implementations, the network environment 500 includes a device manufacturing entity 502, a device operating entity 504, a network operating entity 506, and the network access controller 300. In some implementations, the device manufacturing entity 502 manufactures/assembles devices such as the mobile device 20 shown in FIGS. 1-3. In some implementations, the device operating entity 504 controls/manages devices. For example, in some implementations, the device operating entity 504 includes a mobile device management (MDM) server. In some implementations, the device operating entity 504 resides in an enterprise network. In some implementations, the network operating entity 506 controls/manages a network (e.g., the wireless network 40 shown in FIGS. 1-3).

In some implementations, the network access controller 300 provides device IDs for devices associated with the device manufacturing entity 502, the device operating entity 504 and/or the network operating entity 506. As illustrated in FIG. 5, in some implementations, the network operating entity 506 transmits an identity request 508 to the network access controller 300. In some implementations, the identity request 508 is a request to generate a device ID and/or login credentials for a device operating on a network controlled by the network operating entity 506. As can be seen in FIG. 5, in some implementations, the network access controller 300 generates a device ID 510 and transmits the device ID 510 to the network operating entity 506. In some implementations, the device ID 510 is the same as the device ID 22 shown in FIGS. 1 and 3. In some implementations, the network access controller 300 provides device IDs for devices that are controlled/managed by the device operating entity 504. In some implementations, the network access controller 300 provides device IDs for devices manufactured by the device manufacturing entity 502. In some implementations, the device ID 510 and/or corresponding credentials are valid for a predetermined amount of time (e.g., 1 day, 1 week, 1 year, 10 years, etc.). In some implementations, the network access controller 300 renews the device ID 510 in response to receiving a request to renew the device ID 510. In some implementations, the network access controller 300 provides identity as a service (e.g., by providing the device ID 510, and/or charging a fee for providing the device ID 510).

Figure 6:
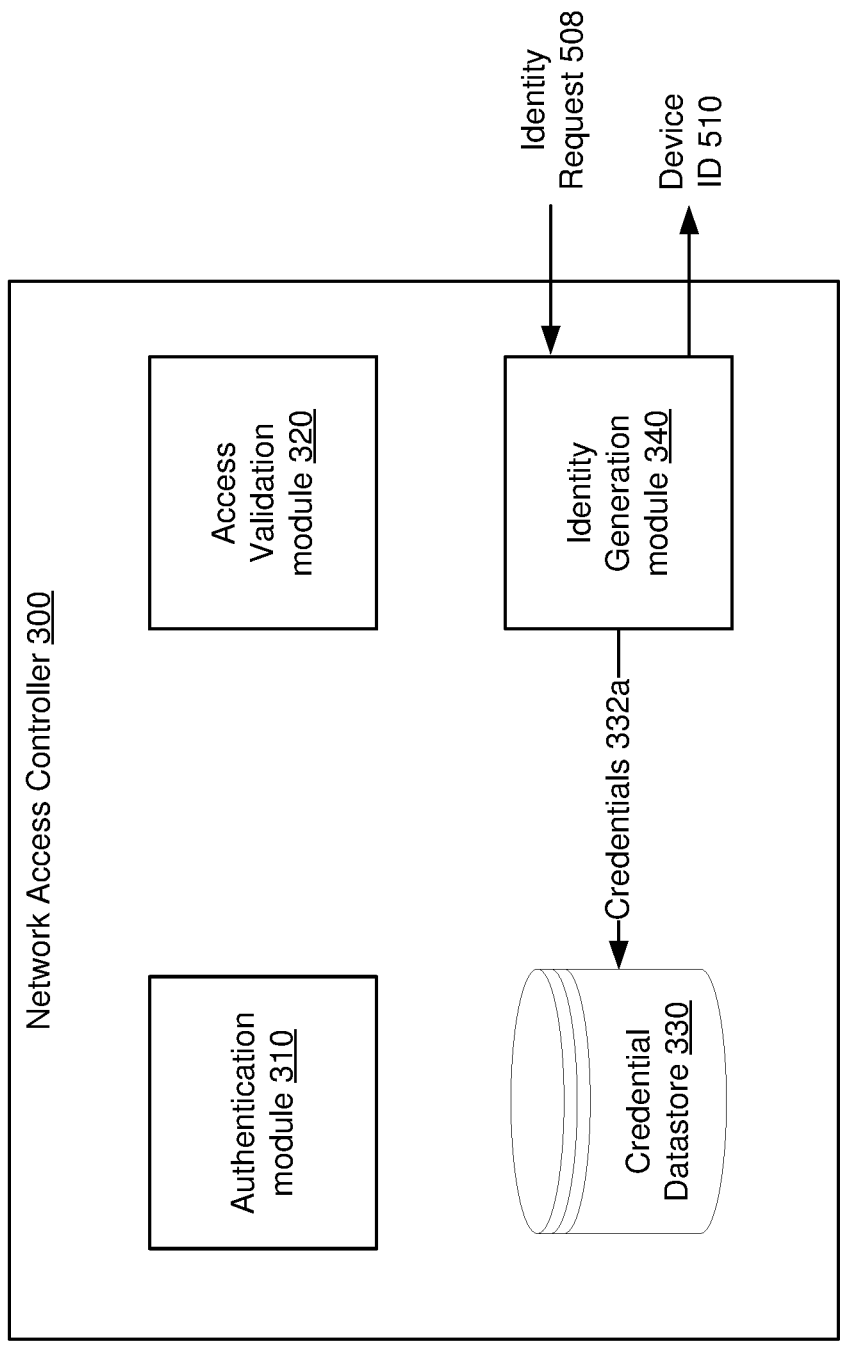
FIG. 6 is another block diagram of the network access controller in accordance with some implementations.

FIG. 6 is another block diagram of the network access controller 300 in accordance with some implementations. In some implementations, the network access controller 300 includes an identity generation module 340 that generates the device ID 510 in response to receiving the identity request 508. In some implementations, the identity generation module 340 generates credentials 332a that correspond with the device ID 510. For example, in some implementations, the credentials 332a allow a device with the device ID 510 to access a network (e.g., the cellular network 30 and/or the wireless network 40 shown in FIGS. 1-3). In some implementations, the identity generation module 340 stores the credentials 332a in the credential datastore 330.

Figure 7:
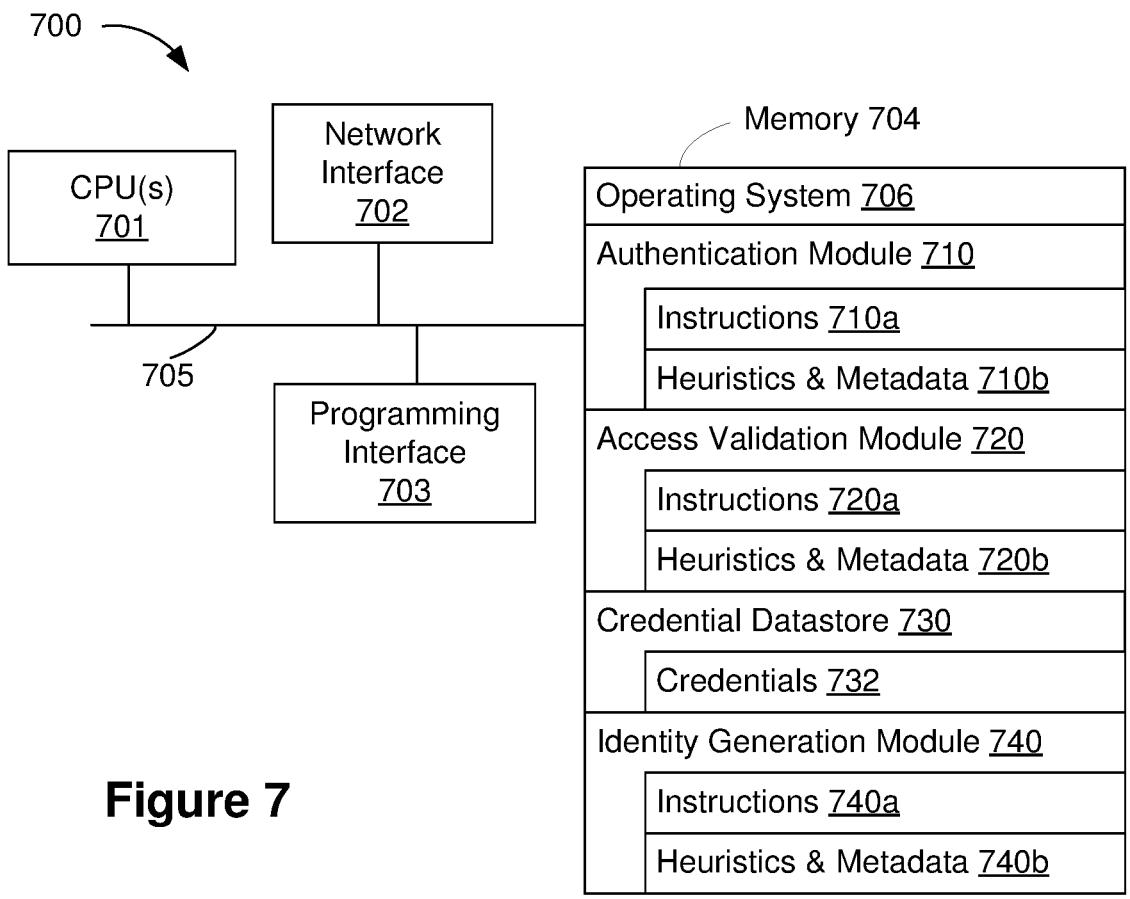
FIG. 7 is a block diagram of a server system enabled with various components of the network access controller in accordance with some implementations.

FIG. 7 is a block diagram of a server system 700 enabled with one or more components of a network access controller (e.g., the network access controller 300 shown in FIGS. 1-3 and 5-6) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 700 includes one or more processing units (CPUs) 701, a network interface 702, a programming interface 703, a memory 704, and one or more communication buses 705 for interconnecting these and various other components.

In some implementations, the network interface 702 is provided to, among other uses, establish and maintain a metadata tunnel between a cloud hosted network management system and at least one private network including one or more compliant devices. In some implementations, the communication buses 705 include circuitry that interconnects and controls communications between system components. The memory 704 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 704 optionally includes one or more storage devices remotely located from the CPU(s) 701. The memory 704 comprises a non-transitory computer readable storage medium.

In some implementations, the memory 704 or the non-transitory computer readable storage medium of the memory 704 stores the following programs, modules and data structures, or a subset thereof including an optional operating system 706, an authentication module 710, an access validation module 720, a credential datastore 730, and an identity generation module 740. In various implementations, the authentication module 710, the access validation module 720, the credential datastore 730 and the identity generation module 740 perform substantially the same operations as the authentication module 310, the access validation module 320, the credential datastore 330, and the identity generation module 340, respectively, shown in FIGS. 3 and 5. For example, in various implementations, the authentication module 710, the access validation module 720 and the credential datastore 730, individually or in combination, authenticate a mobile device (e.g., the mobile device 20 shown in FIGS. 1 and 2), so that the mobile device can access a wireless network (e.g., the wireless network 40 shown in FIGS. 1 and 2) based on having access to a cellular network (e.g., the cellular network 30 shown in FIGS. 1 and 2). To that end, in various implementations, the authentication module 710 includes instructions and/or logic 710a, and heuristics and metadata 710b. In various implementations, the access validation module 720 includes instructions and/or logic 720a, and heuristics and metadata 720b. In various implementations, the credential datastore 730 stores credentials 732 (e.g., the credentials 332 shown in FIG. 3, and/or the credentials 332a shown in FIG. 6). In various implementations, the identity generation module 740 generates/provides device IDs and/or credentials. To that end, in various implementations, the identity generation module 740 includes instructions and/or logic 740a, and heuristics and metadata 740b.

Figure 8:
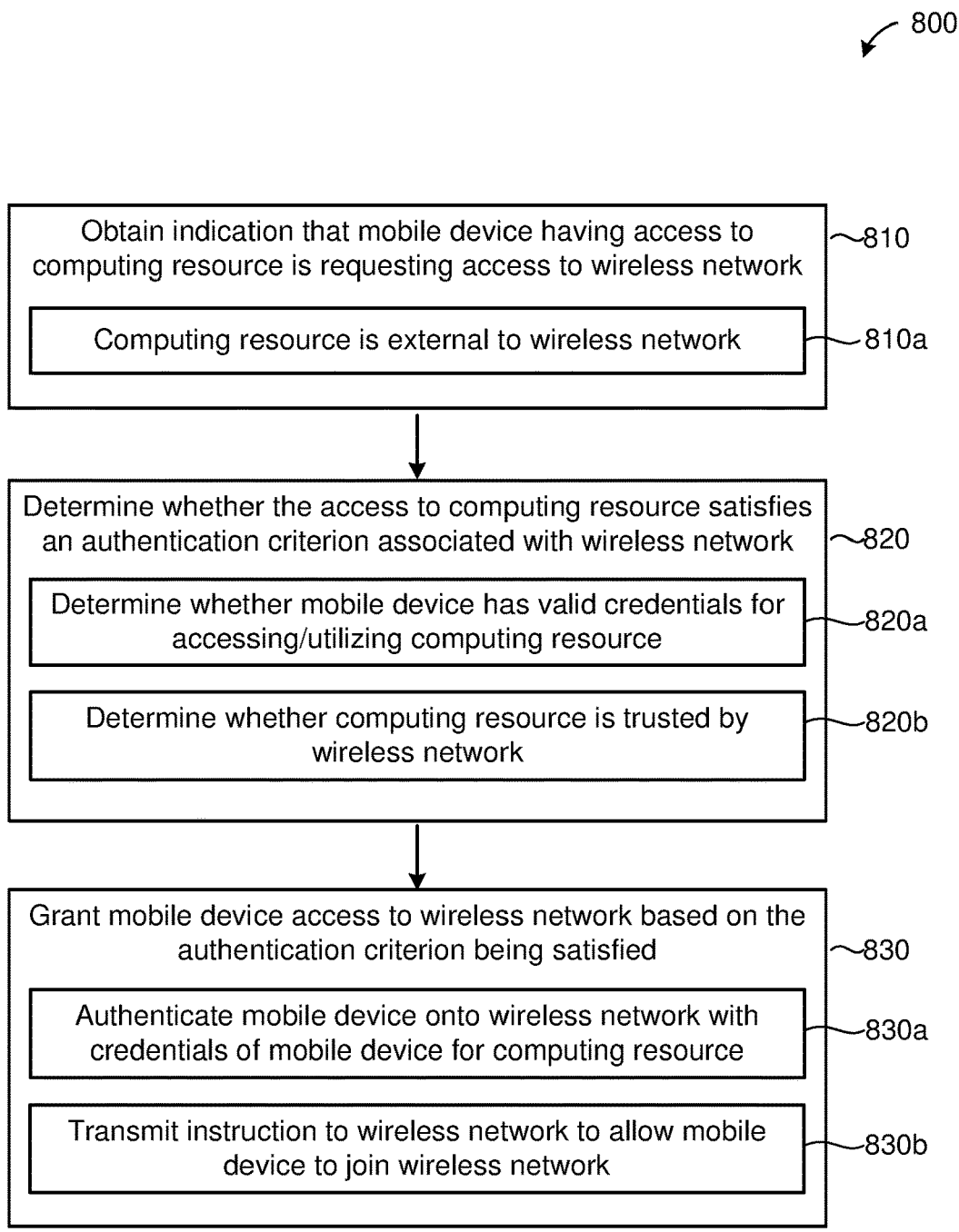
FIG. 8 is a flowchart representation of a method of controlling access to a network in accordance with some implementations.

FIG. 8 is a flowchart representation of a method 800 of controlling access to a network (e.g., a wireless network, for example, the wireless network 40 shown in FIGS. 1-3) in a heterogeneous network environment (e.g., the heterogeneous network environment 10 shown in FIG. 1). In various implementations, the method 800 is implemented as a set of computer readable instructions that are executed at a network access controller (e.g., the network access controller 300 shown in FIGS. 1-3). Briefly, the method 800 includes obtaining an indication that a mobile device having access to a computing resource has requested access to a wireless network, determining whether the access to the computing resource satisfies an authentication criterion associated with the wireless network, and granting the mobile device access to the wireless network based on the authentication criterion being satisfied.

As represented by block 810, in various implementations, the method 800 includes obtaining an indication that a mobile device having access to a computing resource has requested access to a wireless network (e.g., the wireless network 40 shown in FIG. 1-3). As described herein, in some implementations, the computing resource includes another network (e.g., the cellular network 30 shown in FIGS. 1-3), an application (e.g., an application that can be downloaded, installed and executed on the mobile device 20), a distributed computing/storage network (e.g., a cloud storage platform), or the like. As represented by block 810a, in various implementations, the computing resource is external to the wireless network. For example, in some implementations, the computing resource is located outside the wireless network. In some implementations, the computing resource is not controlled by the wireless network. In some implementations, the computing resource is not directly connected to the wireless network. In some implementations, the computing resource and the wireless network are not communicatively coupled (e.g., the computing resource and the wireless network are not configured to communicate with each other). More generally, in various implementations, the computing resource and the wireless network are controlled/operated by different entities.

As represented by block 820, in various implementations, the method 800 includes determining whether the access to the computing resource satisfies an authentication criterion associated with the wireless network. In some implementations, the method 800 includes determining whether or not the mobile device has valid access to the computing resource. For example, as represented by block 820a, in some implementations, the method 800 includes determining whether or not the mobile device has valid credentials for accessing/utilizing the computing resource. As represented by block 820b, in some implementations, the method 800 includes determining whether the computing resource is trusted by the wireless network. For example, in some implementations, the method 800 includes determining whether the computing resource is among a group of computing resources trusted by the wireless network.

In some implementations, the method 800 includes accessing a datastore (e.g., a local datastore, for example, the credentials datastore 330 shown in FIG. 3) to determine whether or not the datastore stores a record which indicates that the mobile device has valid access to the computing resource. In some implementations, the method 800 includes transmitting a validation request to the computing resource (e.g., the validation request 106 shown in FIGS. 1 and 3) to indicate whether the mobile device has valid access to the computing resource. In some implementations, the method 800 includes transmitting the validation request in response to the datastore not storing any information regarding the mobile device and/or the datastore being out-of-date. In some implementations, the method 800 includes receiving a validation response (e.g., the validation response 110 shown in FIGS. 1 and 3) in response to transmitting the validation request. In some implementations, the validation response indicates whether the mobile device has valid access to the computing resource.

As represented by block 830, in various implementations, the method 800 includes granting the mobile device access to the wireless network in response to determining that the access to the computing resource satisfies the authentication criterion associated with the wireless network. For example, in some implementations, the method 800 includes granting the mobile device access to the wireless network in response to determining that the mobile device has valid access to the computing resource. In some implementations, the method 800 includes allowing the mobile device to access the wireless network in response to determining that the mobile device has valid credentials for accessing/utilizing the computing resource. In some implementations, the method 800 includes granting the mobile device access to the wireless network in response to the validation response from the computing resource indicating that the mobile device has valid access to the computing resource.

As represented by block 830*a*, in some implementations, the method 800 includes authenticating the mobile device onto the wireless network with credentials that the mobile device uses to access/utilize the computing resource. As represented by block 830*b*, in some implementations, the method 800 includes transmitting an instruction to the wireless network to allow the mobile device to access (e.g., join) the wireless network. For example, in some implementations, the method 800 includes transmitting an authentication response (e.g., the authentication response 106 shown in FIGS. 1 and 3) to the wireless network indicating that the mobile device has valid access to the computing resource.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a computing device for use in association with a secure enterprise wireless network configured to provide a subscriber level access to network resources which provide data services in the secure enterprise wireless network for mobile devices based on credentials of the mobile devices for authorized users of the secure enterprise wireless network, the computing device including a non-transitory memory, and one or more processors coupled with the non-transitory memory,
    obtaining an indication that a mobile device having access to a cellular network utilizing a first radio access technology (RAT) has requested a connection to the secure enterprise wireless network utilizing a second RAT for obtaining a guest level access to the network resources which provide the data services in the secure enterprise wireless network for the authorized users, the connection to the secure enterprise wireless network being requested by the mobile device via the second RAT of the secure enterprise wireless network and the indication being based on a request to authenticate the mobile device received via the secure enterprise wireless network;
    determining whether the mobile device has valid access to the cellular network for satisfying an authentication criterion associated with the secure enterprise wireless network;
    granting the mobile device the connection to the secure enterprise wireless network to allow the guest level access to the network resources which provide the data services in the secure enterprise wireless network for the authorized users based on the authentication criterion being satisfied; and
    denying the mobile device the connection to the secure enterprise wireless network for the guest level access to the network resources which provide the data services in the secure enterprise wireless network for the authorized users based on the authentication criterion not being satisfied.

2. The method of claim 1, wherein determining whether the mobile device has the valid access to the cellular network for satisfying the authentication criterion associated with the secure enterprise wireless network comprises:
    determining whether the mobile device has valid credentials for the cellular network.

3. The method of claim 2, wherein determining whether the mobile device has the valid credentials for the cellular network comprises:
    obtaining an identifier that identifies the mobile device; and determining whether the identifier is associated with stored credentials for the cellular network.

4. The method of claim 1, wherein determining whether the mobile device has the valid access to the cellular network for satisfying the authentication criterion associated with the secure enterprise wireless network comprises:
determining whether the cellular network is in a group of networks that are trusted by the secure enterprise wireless network.

5. The method of claim 1, wherein granting the mobile device the connection to the secure enterprise wireless network to allow the guest level access to the network resources which provide the data services in the secure enterprise wireless network for the authorized users comprises:
authenticating the mobile device to grant the connection to the secure enterprise wireless network to allow the guest level access to the network resources which provide the data services in the secure enterprise wireless network for the authorized users based on credentials of the mobile device for the cellular network.

6. The method of claim 1, wherein granting the mobile device the connection to the secure enterprise wireless network to allow the guest level access to the network resources which provide the data services in the secure enterprise wireless network for the authorized users comprises:
transmitting an instruction to the secure enterprise wireless network to allow the mobile device to connect to the secure enterprise wireless network to allow the guest level access to the network resources which provide the data services in the secure enterprise wireless network for the authorized users based on credentials of the mobile device for the cellular network.

7. The method of claim 1, further comprising:
allowing the mobile device to connect to the secure enterprise wireless network for the guest level access to the network resources which provide the data services in the secure enterprise wireless network for the authorized users without a sequence of user inputs corresponding to credentials of the mobile device for the secure enterprise wireless network that are different from credentials of the mobile device for the cellular network.

8. The method of claim 1, wherein the secure enterprise wireless network comprises a wireless local area network (WLAN) utilizing the second RAT operating according to IEEE 802.11.

9. A computing device for use in association with a secure enterprise wireless network configured to provide a subscriber level access to network resources which provide data services in the secure enterprise wireless network for mobile devices based on credentials of the mobile devices for authorized users of the secure enterprise wireless network, the computing device comprising:
a processor; and
a non-transitory memory including computer readable instructions, that when executed by the processor, cause the computing device to:
obtain an indication that a mobile device having access to a cellular network utilizing a first radio access technology (RAT) has requested a connection to the secure enterprise wireless network utilizing a second RAT for obtaining a guest level access to the network resources which provide the data services in the secure enterprise wireless network for the authorized users, the connection to the secure enterprise wireless network being requested by the mobile device via the second RAT of the secure enterprise wireless network and the indication being based on a request to authenticate the mobile device received via the secure enterprise wireless network;
determine whether the mobile device has valid access to the cellular network for satisfying an authentication criterion associated with the secure enterprise wireless network;
grant the mobile device the connection to the secure enterprise wireless network to allow the guest level access to the network resources which provide the data services in the secure enterprise wireless network for the authorized users based on the authentication criterion being satisfied; and
deny the mobile device the connection to the secure enterprise wireless network for the guest level access to the network resources which provide the data services in the secure enterprise wireless network for the authorized users based on the authentication criterion not being satisfied.

10. The computing device of claim 9, wherein the computer readable instructions cause the computing device to determine whether the mobile device has the valid access to the cellular network for satisfying the authentication criterion associated with the secure enterprise wireless network by:
determining whether the mobile device has valid credentials for the cellular network.

11. The computing device of claim 10, wherein the computer readable instructions cause the computing device to determine whether the mobile device has the valid credentials for the cellular network by:
obtaining an identifier that identifies the mobile device; and
determining whether the identifier is associated with stored credentials for the cellular network.

12. The computing device of claim 9, wherein the computer readable instructions cause the computing device to determine whether the mobile device has the valid access to the cellular network for satisfying the authentication criterion associated with the secure enterprise wireless network by:
determining whether the cellular network is in a group of networks that are trusted by the secure enterprise wireless network.

13. The computing device of claim 9, wherein the computer readable instructions cause the computing device to grant the mobile device the connection to the secure enterprise wireless network to allow the guest level access to the network resources which provide the data services in the secure enterprise wireless network for the authorized users by:
authenticating the mobile device to grant the connection to the secure enterprise wireless network to allow the guest level access to the network resources which provide the data services in the secure enterprise wireless network for the authorized users based on credentials of the mobile device for the cellular network.

14. The computing device of claim 9, wherein the computer readable instructions cause the computing device to grant the mobile device the connection to the secure enterprise wireless network to allow the guest level access to the network resources which provide the data services in the secure enterprise wireless network for the authorized users by:

transmitting an instruction to the secure enterprise wireless network to allow the mobile device to connect to the secure enterprise wireless network to allow the guest level access to the network resources which provide the data services in the secure enterprise wireless network for the authorized users based on credentials of the mobile device for the cellular network.

15. The computing device of claim 9, wherein the computer readable instructions further cause the computing device to:
allow the mobile device to connect to the secure enterprise wireless network to allow the guest level access to the network resources which provide the data services in the secure enterprise wireless network for the authorized users without a sequence of user inputs corresponding to credentials of the mobile device for the secure enterprise wireless network that are different from credentials of the mobile device for the cellular network.

16. The computing device of claim 9, wherein:
the secure enterprise wireless network comprises a wireless local area network (WLAN) utilizing the second RAT operating according to IEEE 802.11.

17. The computing device of claim 16, wherein the WLAN comprises an enterprise WLAN and the guest level access to the network resources which provide the data services of the enterprise WLAN for the authorized users is provided based on login credentials of the mobile device for the secure enterprise wireless network.

18. The computing device of claim 17, wherein the computer readable instructions cause the computing device to determine that the authentication criterion is not satisfied by one or more of:
determining that the mobile device does not have valid credentials for the cellular network; and
determining that the cellular network is not among a group of networks trusted by the secure enterprise wireless network.

19. The computing device of claim 9, wherein the computer readable instructions further cause the computing device to:
receive a request to generate a device identifier (ID) and credentials for the mobile device;
generate the device ID and the credentials for the mobile device;
transmit the device ID; and
store the credentials in a datastore.

20. A non-transitory computer readable storage medium storing one or more programs for a computing device, the computer device being for use in association with a secure enterprise wireless network configured to provide a subscriber level access to network resources which provide data services in the secure enterprise wireless network for mobile devices based on credentials of the mobile devices for authorized users of the secure enterprise wireless network, the one or more programs comprising instructions, which, when executed by the computing device having a non-transitory memory and one or more processors, cause the computing device to perform or cause performance of:
obtaining an indication that a mobile device having access to a computing resource has requested a connection to the secure enterprise wireless network utilizing a radio access technology (RAT) for obtaining a guest level access to the network resources which provide the data services in the secure enterprise wireless network for the authorized users, the connection to the secure enterprise wireless network being requested by the mobile device via the RAT of the secure enterprise wireless network and the indication being based on a request to authenticate the mobile device received via the secure enterprise wireless network;
determining whether the mobile device has valid access to the computing resource for satisfying an authentication criterion associated with the secure enterprise wireless network;
granting the mobile device the connection to the secure enterprise wireless network for the guest level access to the network resources which provide the data services in the secure enterprise wireless network for the authorized users based on the authentication criterion being satisfied; and
denying the mobile device the connection to the secure enterprise wireless network for the guest level access to the network resources which provide the data services in the secure enterprise wireless network for the authorized users based on the authentication criterion not being satisfied.

* * * * *